April 24, 1962

C. P. WEAVER 3,030,760

SIDE DELIVERY RAKE

Filed Sept. 8, 1959

INVENTOR
CALVIN P. WEAVER

BY *Dybvig and Jacox*

HIS ATTORNEYS

April 24, 1962  C. P. WEAVER  3,030,760
SIDE DELIVERY RAKE

Filed Sept. 8, 1959

INVENTOR
CALVIN P. WEAVER

BY Dybvig and Jacox

HIS ATTORNEYS 3,030,760
SIDE DELIVERY RAKE
Calvin P. Weaver, 226 W. Main St., Tipp City, Ohio
Filed Sept. 8, 1959, Ser. No. 838,598
9 Claims. (Cl. 56—377)

This invention relates to a side delivery rake used in gathering hay and the like. The invention relates more particularly to a side delivery rake, the raking means of which does not require the use of conventional stripper bars.

This application is related to my co-pending application Serial Number 512,607, filed June 2, 1955, now Patent No. 2,906,084.

Previously, all side delivery hay rakes have been provided with stripper bars. In raking with conventional side delivery rakes, the raked hay in the formation of a windrow at the forward portion of the rake tends to overlap the raking bars and therefore the stripping bars are needed to remove the hay from the raking bars. This stripping action between the raking bars and the stripping bars causes considerable crushing and crumbling of the leaves and the stems of the hay and is therefore objectionable.

Thus, an object of this invention is to provide a side delivery hay rake which has excellent raking action without the use of stripping bars.

Another object of this invention is to provide a side delivery rake which builds a windrow below the raking bars and therefore the windrow does not overlap the raking bars.

Another object of this invention is to provide such a side delivery rake which is easily and readily attachable to a tractor or other vehicle for propulsion thereof.

Another object of this invention is to provide such a side delivery rake which may be operated by power supplied by the propelling means or which may be operated by means carried by the rake.

Another object of this invention is to provide such a rake which may be sturdily constructed at relatively low cost and which is long lived.

Other objects and advantages reside in the construction of parts, the combination thereof, the method of manufacture, and the mode of operation, as will become more apparent from the following description.

Figure 1:
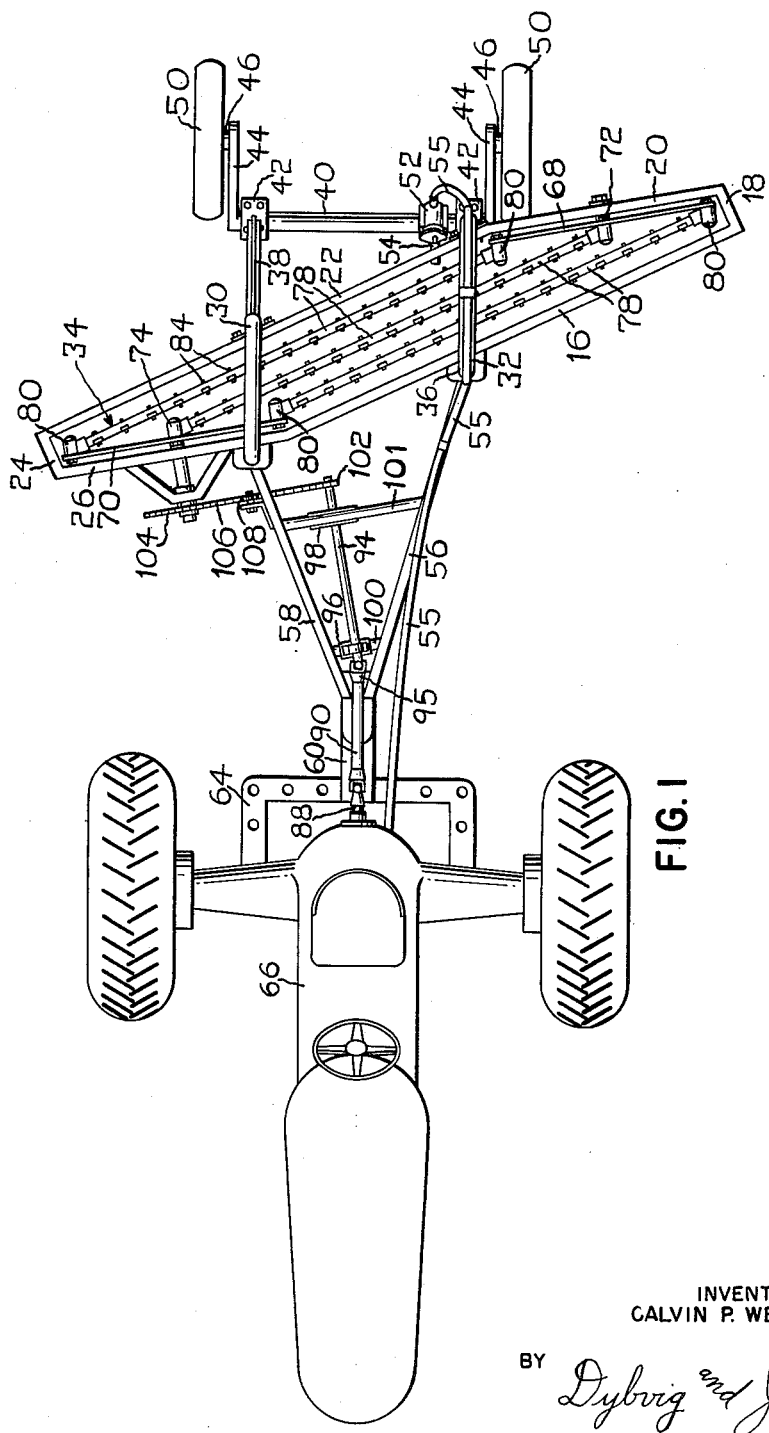
FIGURE 1 is a top plan view of a rake of this invention, showing the rake attached to a tractor for propulsion and operation thereof.

Referring to the drawings in detail, a hay rake of this invention comprises support structure which includes a plurality of elongate frame members 16, 18, 20, 22, 24, and 26. The frame members 16, 18, 20, 22, 24, and 26 are attached one to the other in end to end relationship to form a loop as best shown in FIGURE 1. The frame members 16, 18, 20, 22, 24, and 26 are preferably in substantially the same plane. The loop formed by the frame members is any suitable shape.

Connector members 30 and 32 are attached to the frame members 16 and 22 and extend over a raking means 34 which is carried by the support structure, as discussed below. Extension members 36 and 38 connect to the frame member 22 and extend downwardly therefrom to a cross bar 40. The cross bar 40 is rotatably attached to the extension members 36 and 38 by any suitable means such as bracket members 42. Rigidly attached to the cross bar member 40 at each end thereof is an arm 44 which extends normally from the cross bar 40. At the end of each of the arm members 44 is a shaft 46 which is rigidly attached thereto. Each shaft member 46 rotatably supports a wheel member 50.

Means are provided for adjusting the position of the frame member 22 with respect to the surface upon which the wheels 50 are located. Herein, a reciprocally operable fluid motor 52 is pivotally attached to the cross bar 40 and has a piston rod 54 pivotally attached to the frame member 22. A fluid conduit 55 connects from the fluid motor 52 to the hydraulic system of the propelling vehicle for operation of the motor 52. Adjustment of the piston rod 54 lowers or raises the cross bar 40 by changing the angle of the arms 44. Therefore, the frame member 22 may be raised or lowered by operation of the fluid motor 52. However, it is to be understood that any suitable adjustable support member may be used between the frame member 22 and the cross bar 40 for lowering or raising the support structure.

Extending angularly downwardly from the frame member 16 are connector members 56 and 58, each of which has the lower end thereof attached to a tongue 60 which is adapted to be attached to a draw bar 64 of a tractor 66. A spider member 68 has a shaft 72 carried by the frame member 20. A spider member 70 has a shaft 74 carried by the frame member 26. A plurality of raking bars 78 are rotatably angularly connected to each of the spider members 68 and 70 by means of pins 80.

Figure 2:
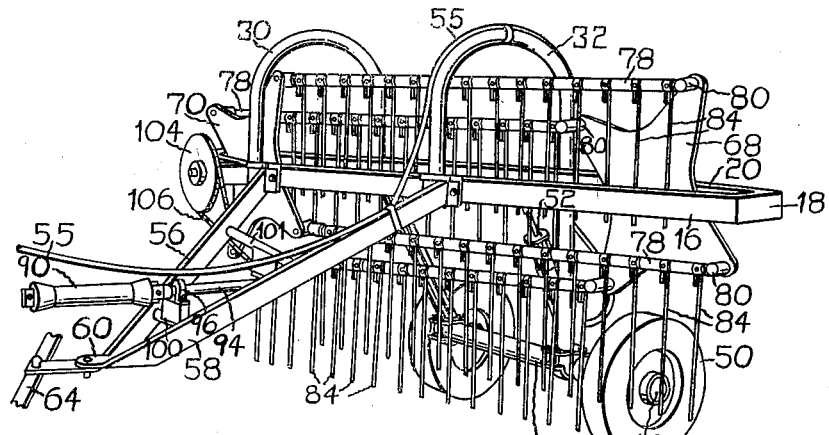
FIGURE 2 is a perspective view showing a side delivery rake of this invention.
Figure 3:
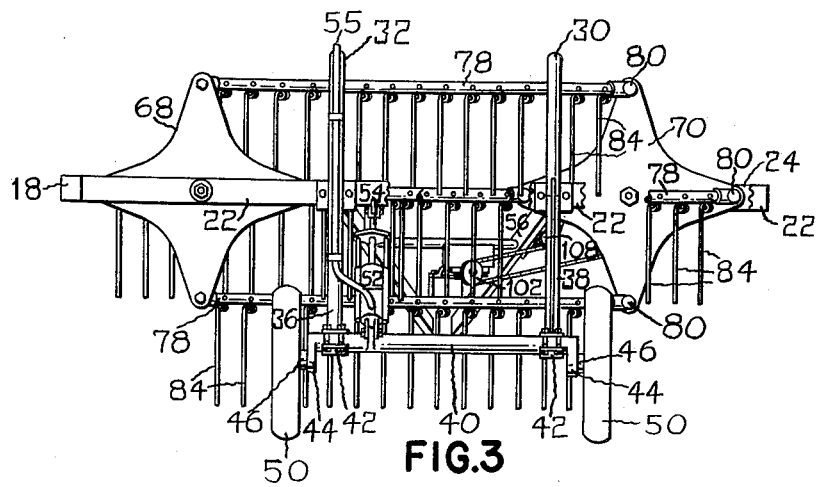
FIGURE 3 is a rear elevational view with parts broken away showing a side delivery rake of this invention.

To each of the raking bar members 78 is attached a plurality of teeth 84. Each of the teeth 84 extends vertically downwardly from its supporting raking bar 78. As best shown in FIGURES 2 and 3, each of the raking teeth 84 extends from its respective raking bar 78 a distance approximately equal to the distance from the axis of rotation of one of the spider members 68 and 70 to one of its pin members 80. In other words, each of the raking teeth 84 is approximately equal in length to the radius of rotation of each of the spider members 68 and 70. However, the length of each of the teeth 84 may be slightly shorter or slightly longer than the radius of rotation of the spider members 68 and 70.

Attached to a rotary power take-off connection 88 of the tractor 66 is a shaft 90 which connects to a shaft 94 by means of a universal joint 95. The shaft 94 is rotatably supported by bearing members 96 and 98. The bearings 96 and 98 are carried by support pieces 100 and 101, respectively. A sprocket 102 is attached at the end of the shaft 94. The shaft 94 is operably connected to a drive wheel 104 which is rigidly carried by the shaft 74. A chain or belt 106 or other suitable means extends from the sprocket 102 to the drive wheel 104. An idler or tensioning wheel 108 is engaged by the chain or belt 106 between the sprocket 102 and the drive wheel 104. Thus, it is understood that the power take-off connection 88 drives the spider 70 through the shafts 90 and 94 and through the chain or belt 106. The spider 68 rotates with the spider 70 due to the fact that the spiders 68 and 70 are connected through the raking bars 78. For raking operation the spider members 68 and 70 are rotated so that the raking bar 78 which is closest to the frame member 16 moves upwardly.

It is to be noted that FIGURE 1 shows that there is a comparatively small clearance between the forwardmost raking bar 78 and the frame member 16. Under ordinary raking conditons the hay being raked does not accumulate higher than the forward raking bar due to the fact that the teeth 84 are approximately equal to the radius of the spiders 68 and 70. It has been found that a suitable length of the teeth is in the order of 13 to 34 inches. However, when raking into the wind, the hay is pressed against the teeth or tends to cling to the teeth, particularly toward the discharge end of the raking bars. The height or rise of this hay is maintained below the frame member 16 as the frame member 16 restricts the upward movement of the hay. Thus, the frame member 16 aids in the raking action when raking against the wind.

Due to the fact that the raking teeth 84 have a long length and are approximately equal to the radius of rotation of each of the spider members 68 and 70, it is not necessary to provide stripper bars which in conventional side delivery rakes are disposed intermediate the raking teeth. Therefore, excellent raking action occurs with the least amount of damage to the hay during raking operation by the hay rake of this invention.

A hay rake of this invention may be used as a tedder by reversing the direction of rotation of the spider members.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a side delivery rake, support structure, a pair of similar spaced apart rotary spider members carried by the support structure and establishing a center of rotation therebetween, a plurality of raking bars rotatably carried by the spider members and disposed therebetween, a plurality of raking teeth vertically attached to each of the raking bars, each raking tooth being approximately equal to the distance from the center of rotation of the spider members to the raking bar which supports the tooth.

2. In a side delivery rake, support structure, a pair of raking bar carrier members rotatably carried at spaced-apart portions of the support structure, a plurality of raking bars rotatably carried by the raking bar carrier members and extending therebetween, a plurality of raking teeth vertically attached to each of the raking bars, each of the teeth extending from its respective raking bar a distance approximately equal to the distance from the attachment of the raking bar to the carrier member to the center of rotation of the carrier member.

3. In a side delivery rake, support structure, a pair of raking bar carrier members rotatably supported at spaced-apart portions of the support structure and establishing an axis of rotation at the center thereof, a plurality of parallel raking bars supported by the carrier members and movable about said axis of rotation, a plurality of raking teeth vertically attached to each of the raking bars, each of the raking teeth extending from its respective raking bar a distance approximately equal to the radius of rotation of the raking bar which supports the tooth, the support structure including a forward elongate member substantially parallel to the raking bars, each of the carrier members being positioned closely to the forward elongate member so that during rotation of the carrier members each of the raking bars moves to a position in close proximity to the elongate member.

4. In a side delivery rake adapted to be propelled by a vehicle during operation thereof, support structure, wheels supporting the support structure, means attached to the support structure for connection thereof to the propelling vehicle, a pair of raking bar carrier members rotatably attached to the support structure, a plurality of raking bar members rotatably attached to the carrier members and extending therebetween, the distance from the center of rotation of each of the carrier members to the position of connection of the raking bars thereto being in the order of thirteen to thirty-four inches, a plurality of raking teeth vertically attached to each of the raking bars, each of the raking teeth extending from its respective raking bar a distance approximately equal to the radius of rotation of its raking bar.

5. A side delivery rake comprising support structure, rotary raking means carried by the support structure including rotary raking bar support members, a plurality of raking bar members attached to the raking bar support members, a plurality of raking teeth attached to each of the raking bar members, each of the raking teeth extending from its respective raking bar member a distance approximately equal to the distance from its respective raking bar member to the axis of rotation of the raking bar support members, the support structure having a front horizontal cross member which is positioned with respect to the raking bar carrier members so that the minimum clearance between the raking bar members and the cross member is less than one half the length of any of the teeth.

6. A side delivery rake comprising raking means, support structure, a portion of the support structure being disposed substantially in a given plane and encompassing the raking means, the raking means including a pair of raking bar carrier members rotatably supported by the support structure at spaced-apart portions thereof, a plurality of raking bar members attached to the carrier members and movable therewith, a plurality of raking teeth attached to each of the raking bars and extending downwardly therefrom, each of the teeth being approximately equal in length to the radius of rotation of the carrier members.

7. A side delivery rake comprising raking means, support structure disposed substantially in a given plane and encompassing the raking means, the raking means including a pair of raking bar carrier members rotatably supported by the support structure and disposed at spaced-apart portions thereof, a plurality of raking bar members attached to the carrier members and movable therewith, the raking bar members being substantially parallel to the support structure, a plurality of raking teeth attached to each of the raking bars and extending downwardly therefrom, each of the teeth being approximately equal in length to the radius of rotation of the carrier members.

8. In a side delivery rake, support structure, raking means carried by the support structure, a portion of the support structure being in a given plane and encompassing the raking means, the raking means including a pair of rotary raking bar carrier members, the axis of rotation of the carrier members being in said given plane, a plurality of raking bars attached to the carrier members and extending therebetween, the raking bars being substantially parallel with the plane of said portion of the raking structure, a plurality of raking teeth attached to each of the raking bars and extending downwardly therefrom, each of the raking teeth being approximately equal in length to the radius of rotation of said carrier members.

9. A side delivery rake comprising support structure, wheel members attached to the support structure for movement thereof, raking means carried by the support structure, the raking means including a pair of carrier members rotatably disposed at opposite portions of the support structure, a plurality of raking bars rotatably attached to the carrier members and disposed therebetween for rotation therewith, the bars causing both of the carrier members to rotate together, means connected to one of the carrier members for rotation thereof, a plurality of raking teeth attached to each of the raking bars and extending downwardly therefrom, each of the teeth being approximately equal in length to the radius of rotation of the carrier members, the support structure including a frame member disposed in close relationship to the carrier members so that there is small clearance between the raking bars and the frame member as the raking bars are moved by the carrier members.

References Cited in the file of this patent

UNITED STATES PATENTS

| 960,950 | Keeser | June 7, 1910 |
| 2,075,555 | Synck | Mar. 30, 1937 |
| 2,296,065 | Slamp | Sept. 15, 1942 |
| 2,729,931 | Hamilton | Jan. 10, 1956 |